Aug. 29, 1944.  L. F. CARTER  2,356,749
GYROSCOPIC ERECTION DEVICE
Filed Dec. 30, 1941  2 Sheets-Sheet 1

INVENTOR
LESLIE F. CARTER
BY
Herbert H. Thompson
HIS ATTORNEY

Aug. 29, 1944.   L. F. CARTER   2,356,749
GYROSCOPIC ERECTION DEVICE
Filed Dec. 30, 1941   2 Sheets-Sheet 2

INVENTOR
LESLIE F. CARTER
BY
Herbert H. Thompson
HIS ATTORNEY

Patented Aug. 29, 1944

2,356,749

UNITED STATES PATENT OFFICE 2,356,749

GYROSCOPIC ERECTION DEVICE

Leslie F. Carter, Leonia, N. J., assignor to Sperry Gyroscope Company, Inc., Brooklyn, N. Y., a corporation of New York Application December 30, 1941, Serial No. 424,917

9 Claims. (Cl. 74—5)

This invention relates to gravity affected erecting devices for gyro-verticals for maintaining a horizontal reference plane on rapidly moving vehicles such as arcraft or ships. The gyro-vertical or gyroscopic artificial horizon embodying the present inventive concepts includes a gyroscope that is universally supported in substantially neutral equilibrium, preferably with its spin axis situated in a normally vertical position. In accordance with the teaching of the present invention, the force of the erecting torque effective to maintain the spin axis of the gyroscope in a normal erected position is obtained solely by the control and utilization of gravitational influences. The same influence is also employed to position the improved device so the erecting torque is properly directed.

An object of the invention is to provide a gravity affected erecting device by which the spin axis of the gyroscope is maintainable in a truly vertical position and a truly horizontal reference plane maintained.

One of the features of the invention resides in the provision of gravity affected erecting devices for gyroscopes which include a gravity responsive unbalance member movable upon tilt of the gyro-vertical to a position determining the location at which the erecting torque should be applied on the gyroscope.

Another feature of the invention consists in the utilization of means for balancing the unbalanced gravity responsive movable member of the improved erecting device.

A further important feature of the invention is provided by the use of an erecting element which is located eccentrically on the movable gravity responsive member, the erecting element including a passageway for a gravity response means movable therein which when effectively positioned provides an erecting couple on the gyroscope substantially at right angles to the tilt.

Another feature of the invention is the provision of means in a gravity affected erecting device for gyroscopes for counterbalancing any gravitationally influenced turning movement of the device due to the change in the center of gravity thereof when moving from an inoperative to an effective torque applying position.

Other objects, features and structural details of the invention will be apparent from the following description when read in connection with the accompanying drawings, wherein Fig. 1 is a side elevation of a gyro-vertical instrument in which the present inventive concepts are embodied, the casing for the instrument being shown in cross-section to show the interior construction.

Figure 1:
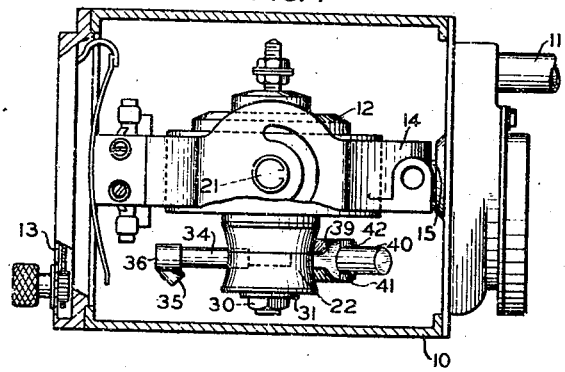
Figure 2:
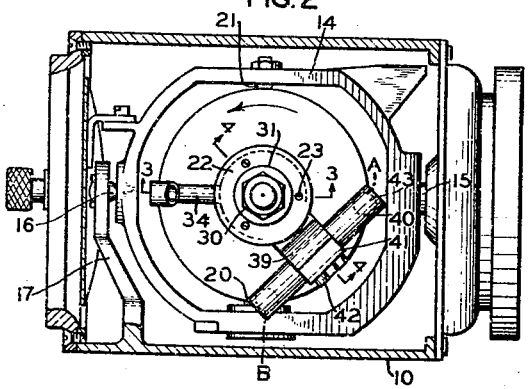
Fig. 2 is a bottom plan view of the instrument as shown in Fig. 1.
Figure 3:
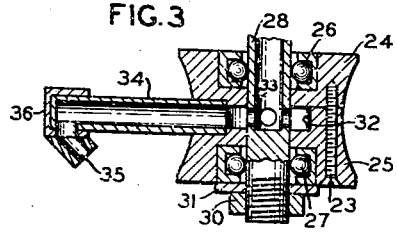
Fig. 3 is an enlarged cross-section view showing the details of the improved gravity affected erecting device, the section being taken on line 3—3, in Fig. 2.
Figure 4:
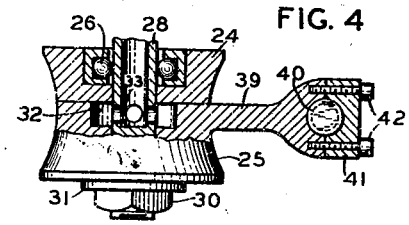
Fig. 4 is a view similar to Fig. 3 with the section being taken on line 4—4, in Fig. 2.

In Figs. 1 and 2 of the drawings, the gyro-vertical or artificial horizon instrument is shown in conventional form, the same being enclosed within an air tight casing 10 from which air is exhausted through a pipe 11. Air is admitted to the interior of the gyroscopic rotor bearing case 12, through suitable openings in the trunnion supports therefor, in the gimbal ring mounting and through an air filter usually located on the casing 10, from the atmosphere in the customary manner. The casing 10 is shown as having the usual transparent front window 13 through which a horizon bar (not shown) may be seen by an observer of the instrument. Any suitable means may be employed to exhaust the air from the interior of the casing 10.

The gyroscope proper includes a rotor (not shown) and its rotor bearing casing 12, the spin axis of the rotor being normally vertical. The rotor may be spun in a suitable manner such as by means of directed air jets or electrically if so desired. The position taken by the gyroscope in the instrument when its spin axis is vertical or erected is clearly shown in Figs. 1 and 6 of the drawings. A customary universal support is provided for the rotor bearing case, the same being formed in this instance by a gimbal ring 14 pivoted about fore and aft trunnions 15 and 16, respectively, located in bearing members contained within the casing 10. The bearing for receiving the aft trunnion 16 is situated on a bracket 11 which extends from the side of the casing 10. Gimbal ring 14, in turn, pivotally supports the rotor bearing case 12 on athwartships pivots 20 and 21, the defined athwartships axis of the universal support being situated perpendicularly with respect to both the provided fore and aft axis of the ring and the normal vertical spin axis of the gyroscope. Air is exhausted from the rotor bearing case, as hereinafter described in detail, the same, in this instance, being drawn into the interior of the air tight casing 10. In order to clearly show the erecting device of the present invention in the assembly views presented, various other well-known details of the gyro-vertical instrument have been omitted.

As shown in the form of invention illustrated in Figs. 1 to 5 of the drawings, the improved erecting device includes a rotatable erecting member designated generally at 22. This member is preferably formed in two parts which are connected together by suitable means such as screws 23. The top part of the member is indicated at 24 and the bottom part at 25, the parts when connected presenting an external appearance somewhat similar to that of a spool. Member 22 is rotatably mounted by means such as bearings 26 and 27 on a hollow tube 28 which in this instance projects downwardly from the bottom of the rotor bearing case 12 and is suitably secured thereto or constructed as a part thereof. The tube 28 is fixed in position on case 12, the same providing a post on which the erecting member 22 is capable of rotating. By this construction, the axis of rotation of the erecting member 22 or spool is arranged in coaxial relation with that of the spin axis of the gyroscope. A nut 30 and washer 31 construction may be employed on the threaded closed end of the tube 28 to longitudinally position the spool or erecting member 22 thereon. A circumferential channel 32 is located in the bottom part 25 of the member 22 adjacent to ports 33 located in the fixed tube 28. Air is exhausted from the interior of the rotor bearing case, in this instance, by way of tube 28, ports 33 and channel 32 and enters the interior of casing 10 through a hollow arm 34 extending radially from the member 22 from a downwardly directed port 35. In the form of the invention shown, member 22 is unbalanced about its vertical axis, the center of gravity of the unbalanced portion lying in the radial plane of port 35 and being represented on the drawings as a mass element 36 located on the end of arm 34 eccentrically with respect to the member 22. The air jet issuing from port 35 situated below the mass element 36 provides a means for balancing the mass so that the spool shaped member 22 is capable of moving freely about its axis. When the spin axis of the gyroscope is vertical there is no influence exerted by the directed air jet or otherwise which would tend to cause the erecting member to rotate, the same being in neutral equilibrium. It will be understood that the air issuing from port 35 is not effective at any time to cause precession of the gimbal ring support for the gyroscope and likewise such air does not provide the erecting force of the improved erecting device. The end of hollow arm 34 adjacent to and contacting the channel 32 is fixed in the member 22 in a desired manner. The directed air jet from port 35 provides a means for balancing the erecting member 22 which in itself can then be considered to be an unbalanced member due to the mass element 36, the invention being claimed in this manner.

The gravity affected erecting means or element for the device is also contained on and forms a part of the member or spool 22. This means includes an arm 39 which extends radially from the bottom part 25 of member 22, the same being spaced from arm 34 in approximately 135° relation. A tubular piece 40 having closed ends also forms a portion of the eccentrically located erecting means for the member 22. In this instance, tubular piece 40 is suitably fixed along the central section of the same to the end of arm 39 by a clamp 41 held in place by means of screws 42 or other desirable connection. The tube 40 is also located in perpendicular relation to the arm 39, one end of the tube extending to a position disposed substantially in 180° relation to the mass element containing arm 34 and the opposite end being disposed in substantially 90° relation to the arm 34. A ball 43 or other moving element located in the guide or tubular piece 40 provides the gravity responsive means by which the force of an erecting couple is obtained to erect the gyroscope upon departure of the same from such position for any reason.

Figure 5:
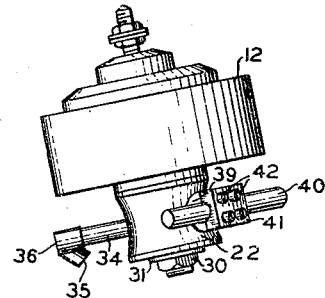
Fig. 5 is a detail side elevation view of the rotor bearing case for the gyroscope and the improved erecting device therewith, the view showing the case in a tilted position and the erecting device positioned for effective operation.
Figure 7:
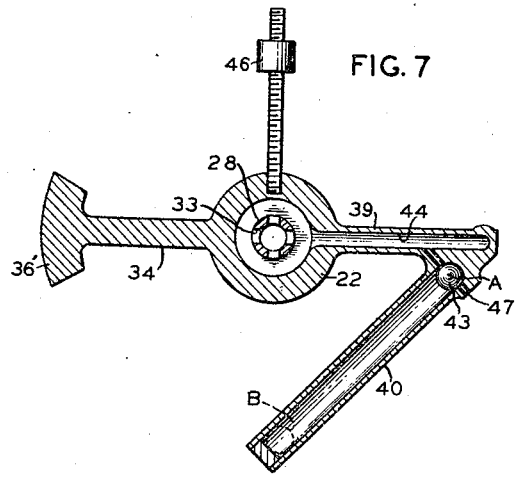
Fig. 7 is an enlarged cross-section of the modified form of erecting device constructed in accordance with the present invention, the view being taken on line 7—7, in Fig. 6.

With reference to Figs. 2 and 7 particularly, the letter A indicates the position of the movable ball 43 in the tubular piece 40 when the gyroscope is in its normal or erected position as shown in Fig. 1. Upon inclination or tilt of the vertical spin axis of the gyroscope, as shown in Fig. 5, the improved erecting device then influenced by the force of gravity operates first by movement of the member 22 about its inclined axis so that the eccentrically positioned mass element 36 seeks and comes to a position of rest at the bottom or lowermost portion of its then inclined circular travel. This effectively sets the balanced member 22 to determine the position at which the erecting torque is applied. Mass element 36 of the rotatable balanced erecting device continuously hunts the lowermost position of its possible circular travel at any particular instance so that when movement of the device occurs it is neither rapid or long. With the improved erecting device thusly positioned, the force of gravity is effective to cause the ball 43 or other gravity responsive means to move from its normal position A in the tubular piece 40, wherein it is disposed substantially in 180° relation with respect to mass element 36, to an effective torque applying position disposed substantially in 90° relation to the mass element in a position indicated at B in Fig. 2. In other words, the ball moves to a position such that the center of pull of the unbalanced forces on member 22 as a whole (i. e., both gravitational and air jet reactive) is shifted from a point concentric with the axis 28 to a point 90 degrees from the low side of the member. The erecting means or element on the spool or erecting member 22 includes a passageway defining part for the gravity responsive means movable from an inoperative position in the passageway to an operative position therein to provide the force of an erecting couple for the gyroscope to cause the spin axis of the same to return to a truly vertical position.

Figure 6:
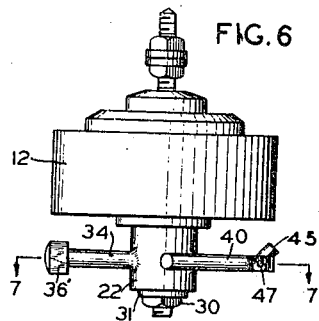
Fig. 6 is a view similar in character to Fig. 5, in which the gyroscopic case is erected and with which a modified form of erecting device is employed.

In the modified form of erecting device shown in Figs. 6 and 7, similarly functioning parts of the device to those previously described are designated by the same reference number. In this instance, arm 34 is solid and the air jet means for balancing the member 22 is provided by passageway 44 and port 45 located in the end of the oppositely extending arm 39. The port 45 is diametrically opposite the center of gravity of the mass element 35' to normally perform the same function as the jet 36 in Fig. 1. Also tubular piece 40 is formed as a part of the arm 39 and extends at an approximate angle of 45° from the end of the same. An adjustable weight 46 is provided opposite the tubular piece 40 to assist in the normal balancing of the erecting device. The positions A and B for the ball or other movable gravity responsive means 43 in the tubular piece 40 are also shown, the present arrangement providing that the ball 43 form a valve closure when inoperatively positioned (position A) which blocks a port 47 that connects with passageway 44 and is directed to counterbalance any gravitational turning moment that may be exerted on the device about its vertical axis due to the change in the center of gravity of the erector spool 22 when the ball moves from an inoperative toward an effective torque applying position. It will be understood that as soon as departure of the spin axis of the gyroscope from the vertical occurs, mass element 36' moves to the low side and the ball 43 leaves its position A so the torque about the axis of rotation of the spool caused by the air jet issuing from port 47 is promptly operative to counterbalance the effect of the change in the center of gravity of the erector 22.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An erecting device for gyro-verticals comprising the combination with a universally supported gyroscope, of a rotatable erecting member for the gyroscope the vertical axis of which is coaxial with the center of gravity of the gyroscope, said member being unbalanced about its axis whereby it is rotated responsive to the force of gravity upon tilt of the gyroscope to bring its heavy side to the low side of the gyroscope, means for balancing said member when its axis is vertical, a guide extending across said member to one side of said axis, and gravity responsive means movable within said guide from a normally ineffective position to an effective torque applying position substantially 90 degrees from the low side of the gyroscope.

2. A gravity affected erecting device for gyroscopes, as claimed in claim 1, in which an air jet is directed from a port located in said member to provide the means for balancing the gravitational pull on the unbalanced portion of said member when its axis is vertical.

3. A gravity affected erecting device for gyroscopes, as claimed in claim 1, in which an air jet is directed from a port located in the end of the tubular piece disposed in 180° relation with respect to the unbalanced portion to provide the means for balancing the same.

4. A gravity affected erecting device for gyro-verticals comprising, in combination, a universally supported gyroscope having a normally vertical spin axis, an unbalanced rotatable erecting member for the gyroscope whose axis is arranged coaxial with that of the spin axis of the same, said member turning in response to the force of gravity thereon upon tilt of the gyroscope to effectively determine the position at which the erecting torque is applied, means for balancing the member when said axis is vertical, an erecting element eccentrically located on said member providing a passageway, and a gravity responsive means movable therein from an ineffective position to a torque applying position disposed substantially in 90° relation with respect to the ineffective position thereof.

5. A gravity affected erecting device for gyroscopes, as claimed in claim 4, in which an air jet provides the means for balancing the rotatable member when its axis is vertical.

6. In a universally supported gyroscope, a gravity affected erecting device on the gyroscope comprising a gravity responsive unbalanced member movable upon tilt of the gyroscope to effectively determine the position at which the erecting torque is exerted, means for balancing said member when the gyroscope is horizontal, a passageway on said member, and a gravity responsive means movable therein from an ineffective or balanced position in said element to an unbalanced position providing an erecting couple on the gyroscope substantially at right angles to the tilt.

7. A gravity affected erecting device for gyroscopes, as claimed in claim 6, in which said gravity responsive means when inoperatively positioned closes a port through which an air jet may be directed to counterbalance any gravitationally influenced turning moment exerted on the device about its vertical axis due to the change in the center of gravity thereof when said means moves from an inoperative to an effective torque applying position.

8. A gravity affected erecting device for gyroscopes as claimed in claim 6, in which means are provided to counterbalance the gravitational turning moment on the device that is due to the change in the center of gravity thereof when said means moves from an inoperative to an effective torque applying position.

9. In a gravity affected erection device for gyro verticals, a gyroscope universally supported in neutral equilibrium, an unbalanced member mounted thereon for freedom about a normally vertical axis whereby, upon tilt of the gyroscope, said member rotates to bring its heavy side at the low side of the gyroscope, freely shiftable means mounted on said member and adapted to occupy a position angularly spaced from the heavy side of said member upon tilt of the gyroscope, and air jet means for exerting a torque on said member for balancing the gravitational pull on said member due to its unbalanced condition when the gyro is vertical and for preventing rotation of said member when said shiftable means leaves its normal position.

LESLIE F. CARTER.